(12) United States Patent
Wilson

(10) Patent No.: US 10,788,837 B2
(45) Date of Patent: Sep. 29, 2020

(54) ROBOTIC APPARATUS FOR PLOWING OF SNOW FROM A PREDEFINED AREA

(71) Applicant: Iain Wilson, Orangeville (CA)

(72) Inventor: Iain Wilson, Orangeville (CA)

(*) Notice: Subject to any disclaimer, the term of this patent is extended or adjusted under 35 U.S.C. 154(b) by 0 days.

(21) Appl. No.: 15/213,068

(22) Filed: Jul. 18, 2016

(65) Prior Publication Data

US 2017/0017234 A1    Jan. 19, 2017

Related U.S. Application Data

(60) Provisional application No. 62/193,546, filed on Jul. 16, 2015.

(51) Int. Cl.
| | | |
|---|---|---|
| *G05D 1/02* | (2020.01) | |
| *E01H 5/06* | (2006.01) | |
| *E01H 5/10* | (2006.01) | |
| *E01H 1/00* | (2006.01) | |

(52) U.S. Cl.
CPC ............ *G05D 1/0219* (2013.01); *E01H 1/00* (2013.01); *E01H 5/061* (2013.01); *E01H 5/10* (2013.01); *G05D 1/0242* (2013.01); *G05D 1/0244* (2013.01); *G05D 1/0263* (2013.01)

(58) Field of Classification Search
CPC .. G05D 1/0219; G05D 1/0234; G05D 1/0242; G05D 1/0244; G05D 1/0263; E01H 5/061; E01H 5/10; E01H 1/00
See application file for complete search history.

(56) References Cited

U.S. PATENT DOCUMENTS

| | | | |
|---|---|---|---|
| 4,530,056 A | | 7/1985 | MacKinnon |
| 4,716,530 A | * | 12/1987 | Ogawa ................ G05D 1/0234 180/168 |
| 5,434,781 A | | 7/1995 | Alofs |
| 5,672,947 A | * | 9/1997 | Hisada ................ G05D 1/0263 318/580 |
| 6,345,217 B1 | | 2/2002 | Zeitler et al. |
| 7,032,682 B2 | | 4/2006 | Berg |

(Continued)

FOREIGN PATENT DOCUMENTS

| | | |
|---|---|---|
| CA | 2794892 | 9/2012 |
| EP | 1016946 | 5/2006 |

(Continued)

OTHER PUBLICATIONS

Susan Meikle, Team RedBlade wins Autonomous Snowplow Competition, Feb. 2014, https://miamioh.edu/news/top-stories/2014/02/redblade-snowplow-wins.html. (Year: 2014).*

(Continued)

*Primary Examiner* — Aaron L Troost

(57) ABSTRACT

The enclosed application discloses an apparatus for removing snow from a predefined area of ground, said apparatus being configured to follow a pre-set pattern of fixed markers on or under the predefined area of ground. By dispensing with the need for GPS guidance, for complex and expensive circuitry and software, for melting of large quantities of snow which can then refreeze into ice, and for potentially dangerous spinning augers, the apparatus allows users to clear snow from a driveway, road or other useful surface without constant attention to steering or personal exposure to the elements.

12 Claims, 14 Drawing Sheets

(56) References Cited

U.S. PATENT DOCUMENTS

| | | | | |
|---|---|---|---|---|
| D643,048 S | * | 8/2011 | Pflum | D15/11 |
| 8,528,237 B1 | * | 9/2013 | Bacall | E01H 5/061 37/231 |
| 2010/0094499 A1 | * | 4/2010 | Anderson | G05D 1/0295 701/23 |
| 2010/0229431 A1 | * | 9/2010 | Mishra | E01H 5/06 37/197 |
| 2011/0118869 A1 | * | 5/2011 | Smith | G06Q 10/06 700/218 |
| 2011/0264320 A1 | * | 10/2011 | Arnaud | G05D 1/0263 701/23 |
| 2013/0325159 A1 | * | 12/2013 | Kilibarda | G05B 15/02 700/114 |
| 2013/0336537 A1 | * | 12/2013 | Reeves | G05D 1/0246 382/104 |
| 2014/0100723 A1 | * | 4/2014 | O'Halloran | B62D 1/283 701/19 |
| 2014/0180478 A1 | | 6/2014 | Letsky | |
| 2014/0222197 A1 | * | 8/2014 | Letsky | A01D 34/008 700/245 |
| 2014/0317966 A1 | * | 10/2014 | Paonessa | E01H 5/062 37/231 |
| 2015/0253427 A1 | * | 9/2015 | Slichter | A01D 75/00 356/5.01 |
| 2016/0002871 A1 | * | 1/2016 | Asgari | E01H 5/102 37/197 |

FOREIGN PATENT DOCUMENTS

| | | | |
|---|---|---|---|
| JP | 06149350 A * | 5/1994 | A47L 11/4061 |
| JP | 2002038417 | 2/2002 | |
| JP | 2007321527 | 12/2007 | |
| JP | 2008190305 | 8/2008 | |

OTHER PUBLICATIONS

Predko, Myke. 2004. 123 Robotics Experiments for the Evil Genius. Toronto: McGraw-Hill pp. 135-137 (example of a conventional circuit schematic for a toy line-following robot).

IShovel. 2008. IShovel—The World's Smartest Robotic Snow Shovel. Youtube video at http://www.youtube.com/watch?v=NGwcCaz-MpA (video appears to show an autonomous snow removal system, but Iain Wilson is unaware of any public disclosures which detail how the machine pictured here actually operated).

Loschiavo, Vittorio. 2015. Here comes the open source Snow Plow Robot http://www.open-electronics.org/here-comes-the-open-source-snow-plow-robot/ (disclosure for a remote-controlled wheel-driven plow).

Alaska Department of Transportation. 2011. Iways Projects: Magnet Snowplow Guidance System. http://www.dot.state.ak.us/iways/proj-MSG.shtml (illustrates use of magnetic guidance to assist a human snowplow driver).

Glogowski, Michal. 2014. Roofus—Snow Shoveling Vehicle. http://mglogo.com/project/roofus/.

* cited by examiner

ROBOTIC APPARATUS FOR PLOWING OF SNOW FROM A PREDEFINED AREA

FIELD OF THE INVENTION

This disclosure relates to semi-autonomous robotic snow-plows which are designed to remove snow within a prepared area.

BACKGROUND

Various household robots are now available which perform domestic chores without the direct physical presence and guidance of a human, such as vacuum cleaners and lawnmowers. Currently marketed snow-removal devices such as snowblowers and human-driven or vehicle-mounted plows require the guidance of a human operator who is either exposed to undesirable weather conditions or housed in a purpose-built outdoor shelter or inside a vehicle and who is required to apply constant guidance to the device. Existing designs such as those disclosed in U.S. Pat. Nos. 4,530,056 A, 6,345,217 B1 and 5,434,781 A disclose autonomous snow-removal devices. Existing designs either require very complex circuitry and GPS guidance systems or direct large amounts of thermal energy to melt significant quantities of snow (which can then refreeze to produce more hazardous icy conditions), or use spinning auger blades. The auger blades specifically pose a potential safety hazard and generate unwanted noise. An autonomous snow-removal device preferably should be able to compensate for variation in the depth, density and texture of snow, which can make navigation by dead-reckoning unreliable.

Many existing household robots rely on random motion in the early stages of mapping out an assigned area. This would be problematic for a snow-removing robot equipped with a plow because snow can be compacted to a point at which it is too dense or heavy to be moved by the apparatus, and random motion might cause such compaction.

Therefore, there is a need for a device which can remove snow safely using a plow, but which is autonomous to the extent that on activation by an operator it repeats a predetermined sequence of tasks. A method for snow removal will be most efficient through a systematic, linear application of force so over a predetermined path. The device will be efficient if the plow is run evenly across the surface to be cleared.

SUMMARY

The present disclosure relates to a self-propelled apparatus adapted for outdoor use at low temperatures which propels snow away from a predetermined area of ground, probably used to facilitate the movement of vehicles, which hereafter will be referred to purely for simplicity as 'the road'. Prior to snowfall fixed markers will be applied to this road which contrast with the normal surface of the road in a manner which is detectable by the sensors built into the apparatus. Such markers may be coloured lines or sequences of points on the surface of the road, or magnets placed on or under the surface of the road, or metal placed on or under the surface of the road, or voltage may be applied to wires on or under the road surface in such a way as to induce electromagnetic signals in parts of the apparatus when they are in proximity to the wires. As the apparatus passes over the signal markers its components transmit this information to a central processor, which in turn activates, deactivates or adjusts the function of a plurality of motors. In an embodiment there is disclosed a system for semi-autonomous robotic snow plowing, comprising:

one or more patterns of guidance markers on a top surface, in a top surface or under said top surface, of an area to be cleared of snow a motorized vehicle having at least one snow plow blade affixed thereto, said motorized vehicle including at least one drive motor connected to a motor control system;

one or more sensors mounted on said motorized vehicle and configured for detecting a presence or absence of said one or more lines of guidance markers on or in a top surface, or under said top surface, of an area to be cleared of snow; and said motorized vehicle including a central processing unit connected to said motor control system, and said one or more sensors, said central processing system being configured to receive sensor readings from said one or more sensors, and based on said sensor readings determining a position of said motorized vehicle with respect to said one or more patterns of guidance markers and said central processing unit using said motor control system to move said motorized vehicle into a given position with respect to said guidance markers while applying sufficient power to move snow while engaging any snow to be cleared with said at least one plow. In an embodiment there is disclosed method for semi-autonomous robotic snow plowing, comprising:

applying one or more patterns of guidance markers on a top surface, or under said top surface, of an area to be cleared of snow;

positioning a motorized vehicle having at least one snow plow blade affixed thereto on said area to be cleared of snow, said motorized vehicle including at least one drive motor connected to a motor control system;

said motorized vehicle having one or more sensors mounted on said motorized vehicle and configured for detecting a presence or absence of said one or more patterns of guidance markers on, or in a top surface, or under said top surface, of an area to be cleared of snow; and said motorized vehicle including a central processing unit connected to said motor control system, and said one or more sensors, said central processing system being configured to receive sensor readings from said one or more sensors, and based on said sensor readings determining a position of said motorized vehicle with respect to said one or more lines of guidance markers and said central processing unit using said motor control system to move said motorized vehicle into a given position with respect to said guidance markers while applying sufficient power to move snow while engaging any snow to be cleared with said at least one plow;

moving said motorized vehicle to plow snow off the area to be cleared of snow while constantly determining a position of said motorized vehicle with respect to said one or more patterns of guidance markers and moving the motorized vehicle into a given position with respect to the at least one pattern of guidance markers while applying sufficient power to move snow while engaging any snow to be cleared with said at least one plow. Embodiments of the semi-autonomous robotic snowplow disclosed herein employ fixed markers and a linear motion of the apparatus across the assigned area to overcome the problems discussed above with respect to household robotic systems.

Such a robotic system would advantageously use fixed navigation points to compensate for variation in the depth, density and texture of snow.

BRIEF DESCRIPTION OF THE DRAWINGS

The embodiments will now be described, by way of example only, with reference to the accompanying drawings, in which.

DETAILED DESCRIPTION

Figure 1A:
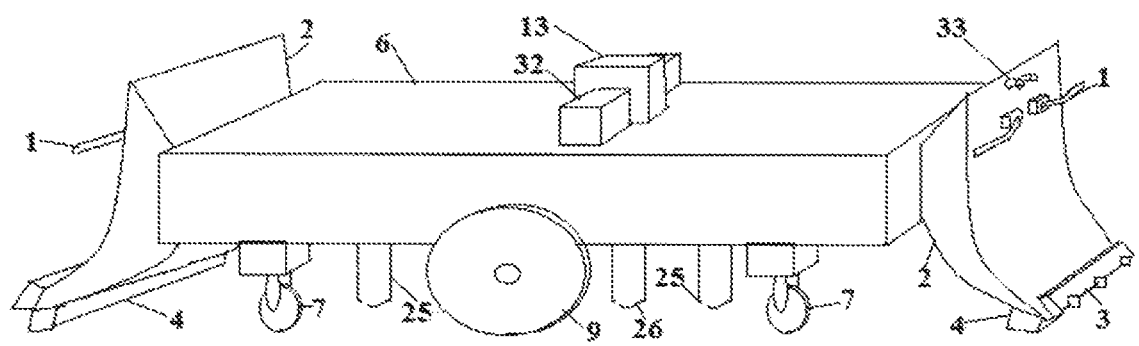
FIG. 1A is a side perspective view of a semi-autonomous robotic snowplow as disclosed herein.

Various embodiments and aspects of the disclosure will be described with reference to details discussed below. The following description and drawings are illustrative of the disclosure and are not to be construed as limiting the disclosure. The Figures are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

Unless defined otherwise, all technical and scientific terms used herein are intended to have the same meaning as commonly understood to one of ordinary skill in the art.

LIST OF LABELS 1 contact sensors, for example micro-switches with levers
2 snow-removing blade
3 optional rigid secondary blade for removing dense snow, with teeth for breaking ice
4 semi-flexible liner for base of blade
5 empty region of darkness
6 frame
7 unpowered casters
8 protective tube narrowing the light sensor's view of the road surface
9 motor-driven wheel
10 non-metallic projection below the frame
11 power wires from control unit to light source
12 road surface
13 control unit
14 optical guidance markers of first colour (band of wavelengths)
15 optical guidance markers of second colour (band of wavelengths)
16 optical guidance markers of third colour (band of wavelengths) triggering the apparatus to reverse its direction of travel and switching from one set of guidance markers to another
17 optical guidance markers of fourth colour (band of wavelengths) triggering the apparatus to reverse its direction of travel but not switching which set of guidance markers are in use
18 drive motor (if an in-wheel or 'hub' motor is used, the motor controller may take its place in FIGS. 1-4)
19 semi-flexible cover excluding outside light from optical sensor units 20 barrier between light sources and light sensors preventing direct transmission of light from source to sensor
21 heater such as high-power resistor or coils of "nichrome" wire
22 light sources such as LEDs of various colours
23 light sensors
24 magnetic sensors such as hall-effect or reed switches (may be placed inside the body of the apparatus for protection)
25 boundary sensor unit
26 guidance sensor unit
27 electronic latch, for example CD4043/4044 or a 555 in bi-stable mode
28 main power switch
29 voltage comparator, for example LM2901
30 H-bridge arrangement of high-power transistors or other switches, for example IRFZ44 field-effect transistors
31 double-throw relay, for example TNA-2C-1205L, or combination of transistors which can perform the same function as a relay such as integrated circuit CD4053
32 power source
33 pulsed infra-red emitter and detector pair for detecting obstacles
34 light filter such as piece of coloured plastic
35 metal detector (may be placed inside the body of the apparatus for protection)
36 coil of wire within which voltage may be induced by proximity to an electrified wire (may be placed inside the body of the apparatus for protection) and circuitry amplifying this voltage
37 throttle wires from motor controller
38 reversing wires from motor controller
39 boundary of assigned area of road
40 optional charging station
41 electrified wire (above wire 42)
42 electrified wire (below wire 41)
43 timer IC, such as 75551 (a 555 derivative rated for low temperatures)
44 boundary marker
45 metal guidance marker
46 metal detector circuitry, converting the output from the metal detector to an electronic signal
47 voltage detector circuitry, converting voltage induced in the coils to an electronic signal
48 brushless motor controller.

Figure 1B:
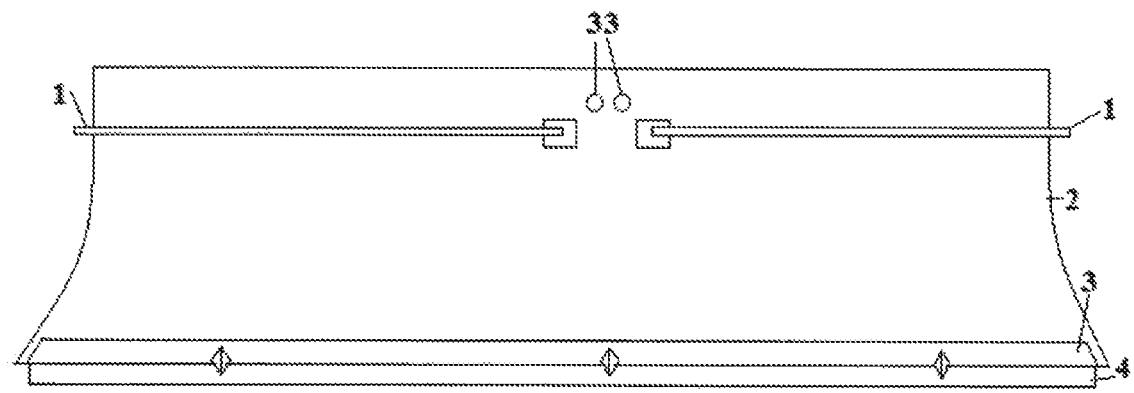
FIG. 1B is a front view of the semi-autonomous robotic snowplow of FIG. 1A.
Figure 1C:
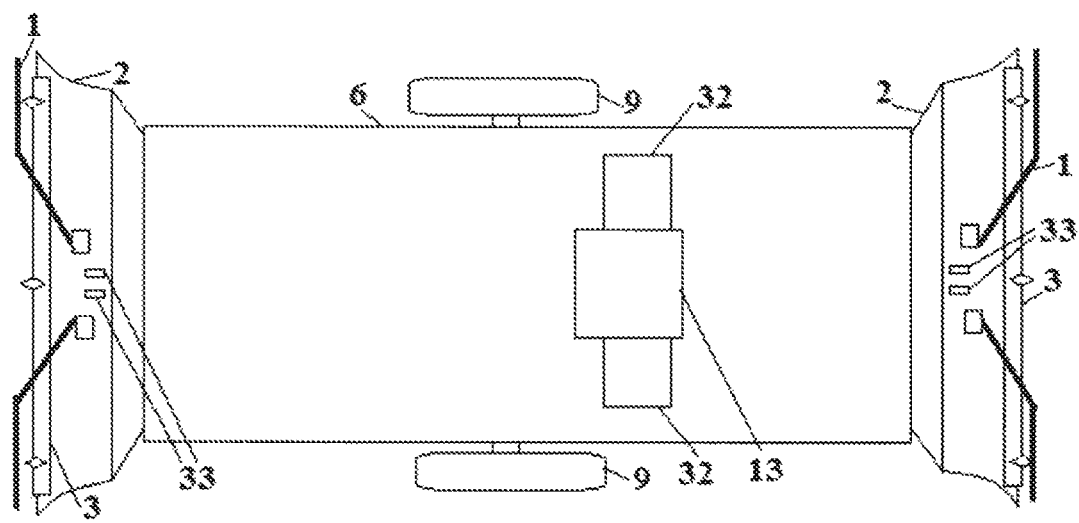
FIG. 1C is a top view of the semi-autonomous robotic snowplow of FIG. 1A.
Figure 2:
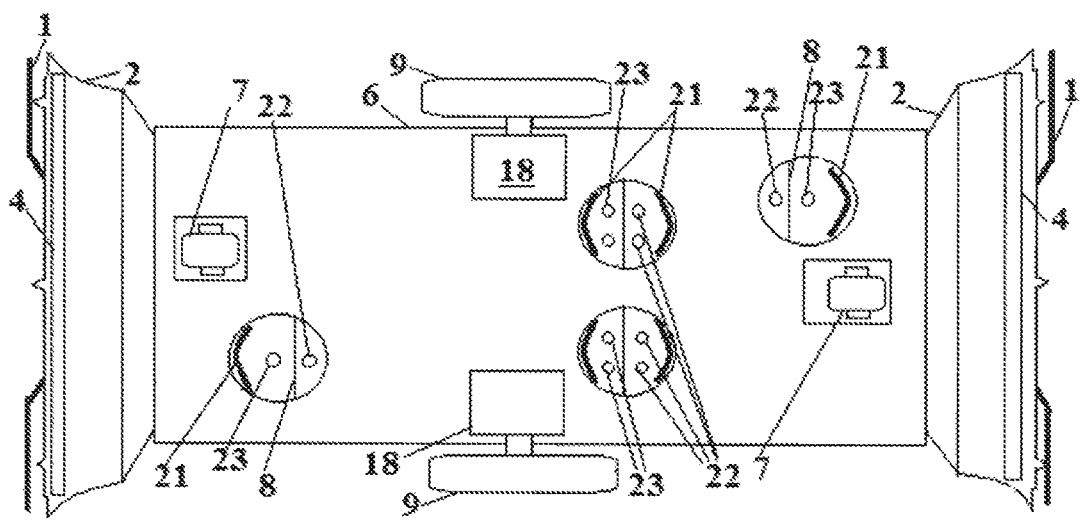
FIG. 2 is a top of an embodiment of the snowplow guided by optical markers.

Referring to FIG. 1, a semi-autonomous robotic snow plow is shown which includes a rigid frame 6 which supports the other components of the plow on a plurality of unpowered wheels or casters 7 able to swivel 360 degrees in two dimensions and drive wheels 9 driven by one of the motors 18 (shown in FIG. 2).

The frame 6 may be disassembled and its weight reduced to facilitate easy transport. The snow plow needs to have an appreciable weight during use in order to effectively move snow. The weight of the apparatus might be increased on-site by many different means, one non-limiting example may include hollow containers mounted to the frame 6 within which a heavy material such as sand may be stored while the snow plow is in use so as to increase its weight.

At least one semi-rigid plow blade(s) 2 attached to frame 6, wherein an embodiment of the invention illustrated in FIGS. 1 to 4B has two semi rigid plow blades 2. The plows blades 2 may be lined at their bases with a substance such as PVC, forming a liner 4 which is sufficiently rigid to push snow but sufficiently flexible to bend around solid obstructions such as imperfections in the road surface. If necessary the plows may incorporate rigid secondary blades 3 slightly above and forward of the aforementioned semi-rigid primary blade 2 and liner 4 (i.e. further from the centre of the frame 6 in a horizontal plane and slightly higher than the bottom of the liner) for moving snow or ice of greater density and firmness. These rigid secondary blades 3 may include projections such as small spikes for breaking ice more efficiently. The plows may incorporate on the outer-facing surface of the blade(s) 2, above the height which compacted snow might reasonably be expected to reach, a plurality of sensors for detecting the buildup of snow. These sensor may include, but are not limited to, pressure-sensitive switches 1, infra-red reflectance detectors comprising an infra-red source transmitting a pulsed beam at a controlled frequency (such as 38 khz) and an infra-red detector configured to detect infra-red at the same frequency 33. The sensors are connected to the processor 13 so as to stop (or reverse, for a fixed period) the motors 18 driving the snow plow in case of contact with an unexpected obstacle. In alternative embodiments these sensors may be other obstacle sensors such as ultrasound sources/sensors and capacitive touch sensors. In an embodiment involving capacitive touch sensors, the sensors may be placed lower on the blade 2 below the maximum height at which the snow contacts the plow blade 2 or wired to a secondary blade as these sensors are less sensitive to triggering by contact with snow or ice.

The snow plow may include a vehicle mounted power source 32, which in the preferred embodiment comprises one or more batteries. However it will be appreciated that an alternative power source such as a solar cell could also be used. Alternatively the snow plow may be powered by the electrical system of a home for applications where the plow is being used for a home driveway or sidewalk where an extension cord may be used.

Figure 7:
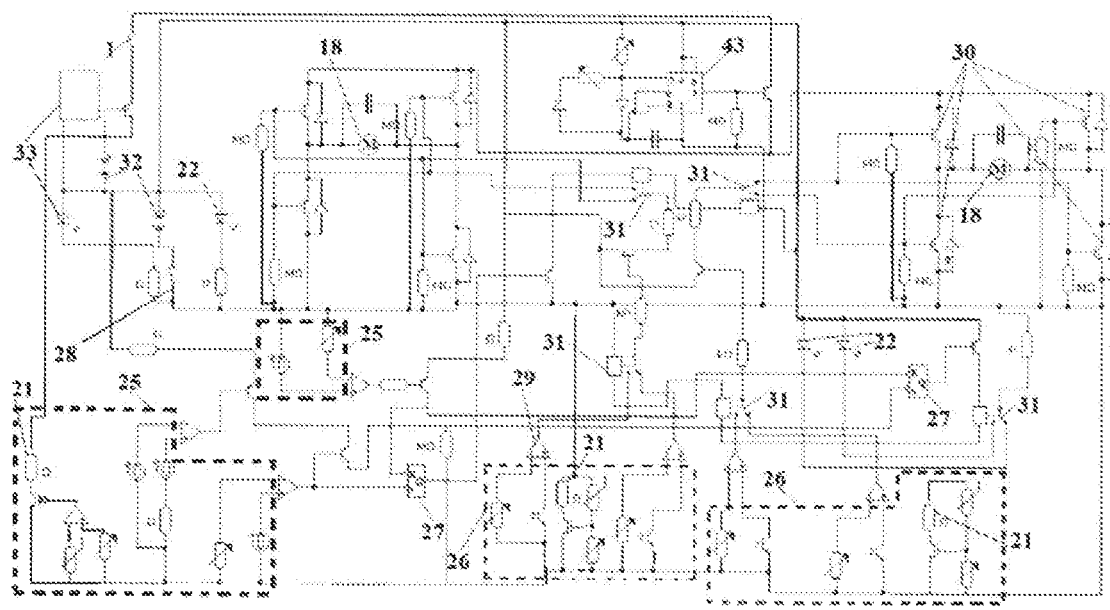
FIG. 7 is a circuit diagram for one possible control system of the optically guided embodiment of the device with optical boundary sensors. Some high-value pull-up and pull-down resistors have been omitted to simplify the diagram.
Figure 8:
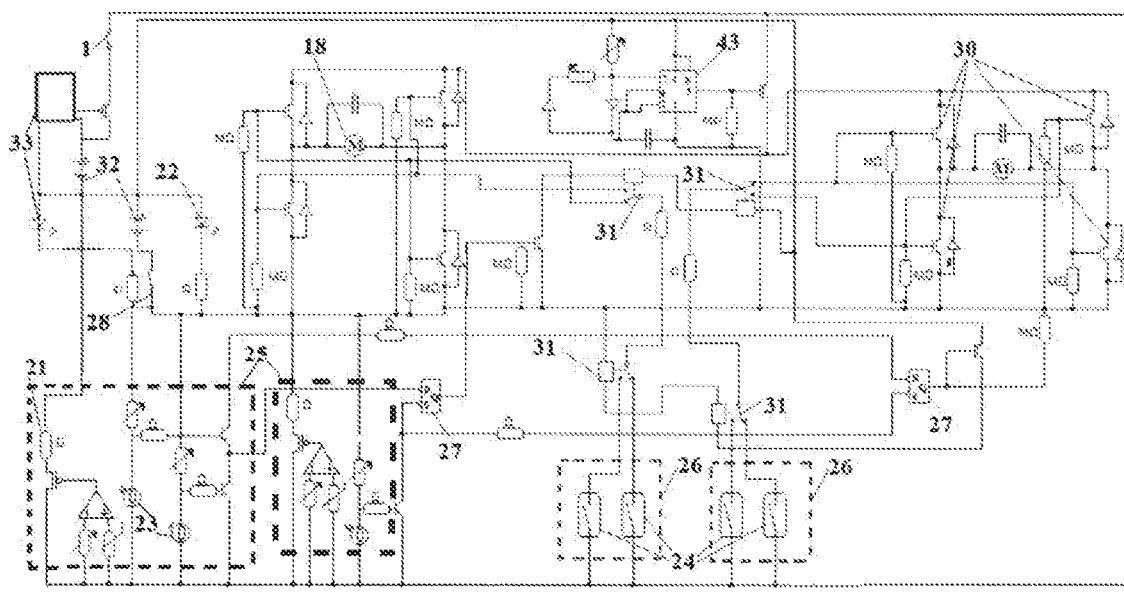
FIG. 8 is a circuit diagram for one possible control system of the magnetically guided embodiment of the device with optical boundary sensors. Some high-value pull-up and pull-down resistors have been omitted to simplify the diagram.

At least one motor 18, is coupled to the wheels 9 but each wheel 9 may have its own motor 18 as shown in FIG. 2 with the motors 18 being powered by the power sources (e.g., batteries) when the switching circuits 30 (upper right corner of FIG. 7) connect them and driving wheels 9.

The snow plow includes a guidance system which includes sensors that may be optically, magnetic, inductive or metallically based. An optically guided system has an advantage due to the simplicity of installing optical guidance markers such as painted lines on an existing road or driveway. On the other hand magnetic, inductive or metallic markers may be installed below the road surface to minimise weathering. Inductive markers will normally require an power supply, but may be split into sections some of which can be disconnected from the power supply so that the apparatus can bypass them. For the optically guided system, the guidance system may include or more guidance sensor units 26 (FIG. 1A, 7 to 10) containing light sensors such as phototransistors, photodiodes or light-dependent resistors 23 (FIG. 2, 3A, 3B, 11), which are connected between the power source 32 (FIG. 1A) and processor and positioned in such a way that light produced by the apparatus can only reach them if it is reflected by an appropriately-coloured marker on the road ('colour' here including non-visible bands of the electromagnetic spectrum such as infra-red). In one embodiment the light sensors are positioned using a protective tube which narrows the field of vision 8 and a barrier separating the sensors from the apparatus's inbuilt light sources 20, and the light sensors may also be shielded from outside light by a length of semi-flexible material 19 covering almost all of the gap between the frame 6 and the road surface 12 so as to create a region of darkness 5 if the light sources described in the paragraph below are not emitting light. The light sensors may be covered with filters 34 which pass only light of the appropriate colour ('colour' again including non-visible bands of the electromagnetic spectrum such as infra-red) to minimise natural light or other external sources of light interference. Two different colours of markers may be distinguished by using light sensors covered by two corresponding colours of filter to control the two inputs of a comparator.

Figure 11:
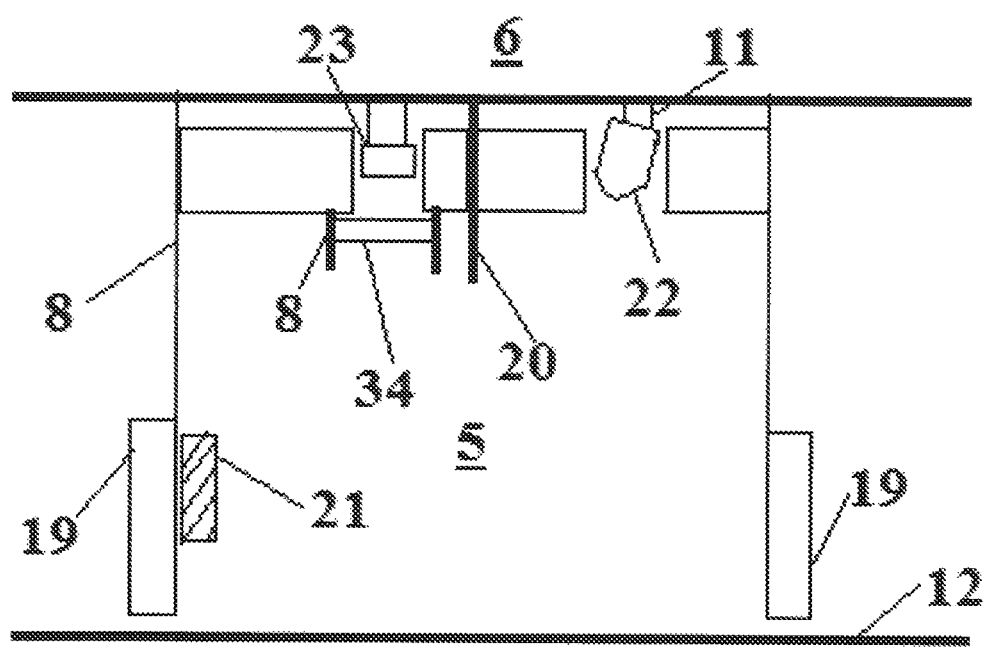
FIG. 11 is a cross-sectional view of an example of an optical guidance sensor.

A plurality of light sources such as light-emitting diodes (LEDs) 22 (see for example FIG. 2) located within the above-mentioned region of darkness and controlled by the central processor 13 mounted on top of frame 6 (FIG. 1A, 1C) through connecting wires 11 (FIG. 11). These LEDs 22 (FIG. 11) emit radiation which reveals a contrast between the preset markers on the road surface and the normal road surface, including the various colours normally visible to the human eye but also other forms of electromagnetic radiation such as infrared frequencies not normally visible to humans and which for the purposes of this disclosure may be treated as extra colours of light. These LED's 22 (FIG. 3B) are required only by an optically-guided embodiment of the snow plow. External light interference may be further prevented through the implementation of LEDs which have a pulsing output. The light source and sensor pairs may use this pulsed light to extend their range and prevent contamination by light not generated by the apparatus. For example, if the markers reflect light in the infrared band (about 950 nm) infrared LEDs may be used and set to emit infrared at 38 KHz, with pulsed infrared detectors TSOP38238 being used as the sensors. Pulsing the current at a given frequency in this way allows the LED to carry a much larger instantaneous current than would otherwise be possible and thus extends the potential range between the sensor and the road surface, and also prevents the snow plow from being misguided by stray light from the environment since the sensors will only respond to the pulsed light generated by the apparatus itself. Sensor/emitter pairs of this type are commonly used in remote control units, as disclosed in U.S. Pat. No. 4,623,887 A, partly for these reasons.

One or more heating elements 21 (FIGS. 2 and 11) to attract or melt any excess snow which is not removed by the blades (snow may not adhere to solid objects at very low temperatures). These heating elements 21 (FIGS. 3 A and 3B) may take several forms, but the snow plow will be energy-efficient and avoid the production of excessive ice if they include high-power resistors positioned below the sensors 22 (FIG. 3B) but slightly offset so as not to interfere with the detection of markers on the road surface and very close to the road surface to attract and melt any remaining snow. For a magnet-guided variation the guidance system, the guidance system comprises a plurality of magnetic sensors 24 (FIGS. 3A and 3B), such as a hall-effect sensor or reed switch, which are positioned in such a way as to maintain proximity to the road surface. The magnetic sensors may be installed on the inside of the plow for protection, provided that they are far from any components which might generate magnetic fields and may be place inside a plastic or fibreglass enclosure.

Figure 3A:
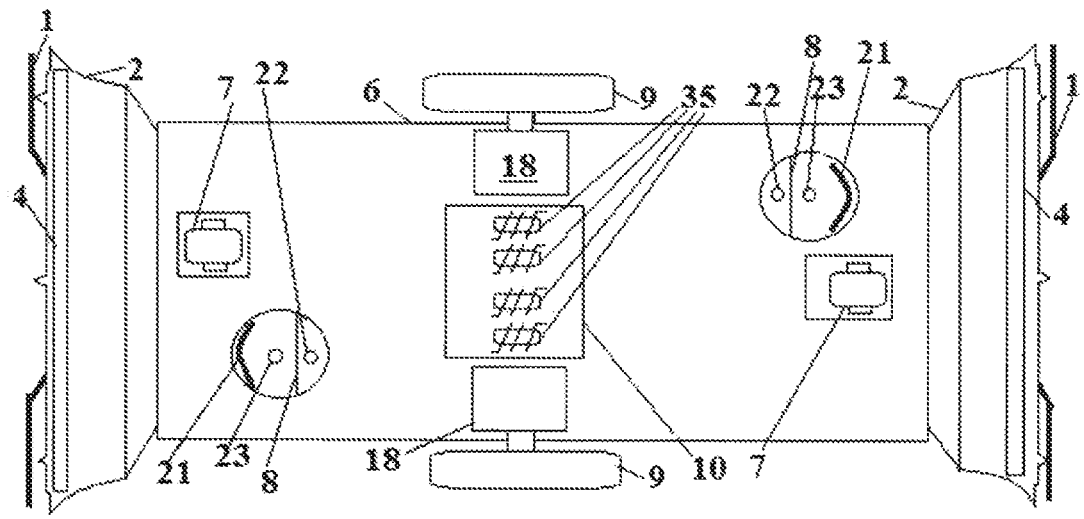
FIG. 3A is a view of the bottom of an embodiment of the snowplow guided by metal markers with optical boundary sensors.
Figure 3B:
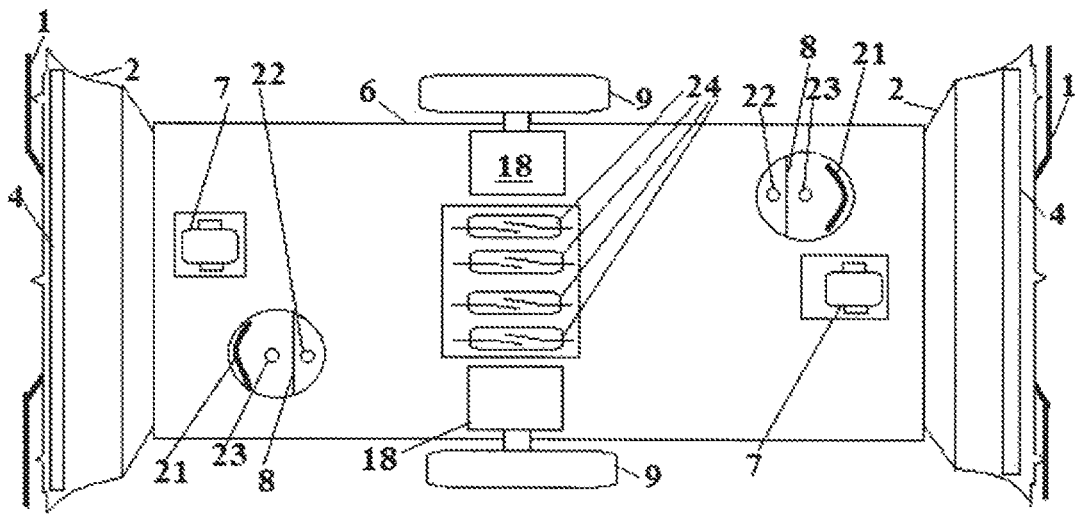
FIG. 3B is a view of the bottom of an embodiment of the snowplow with magnetic guiding markers with optical boundary sensors.
Figure 4A:
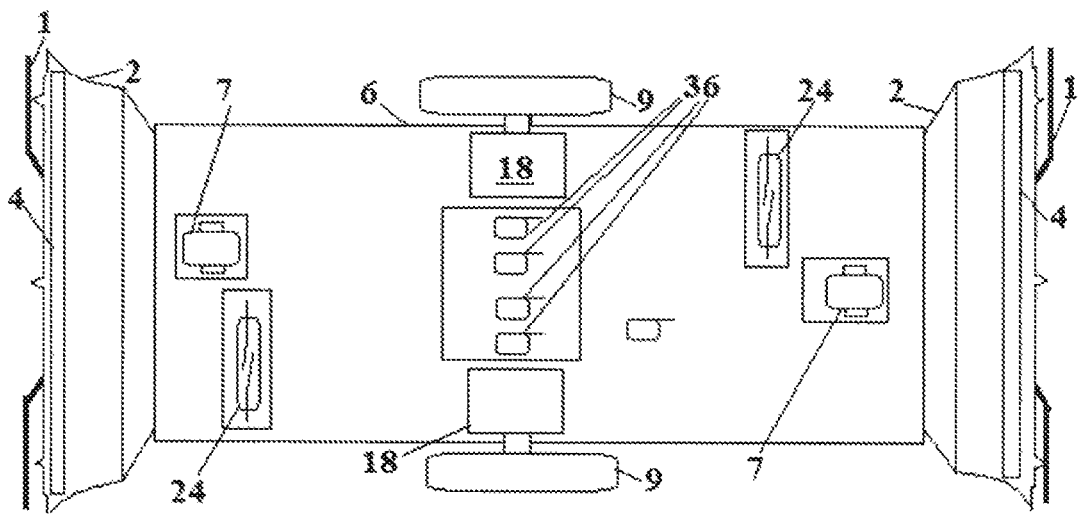
FIG. 4A is a view of the bottom of an embodiment of the snowplow guided by inductive markers, with magnetic boundary sensors.
Figure 4B:
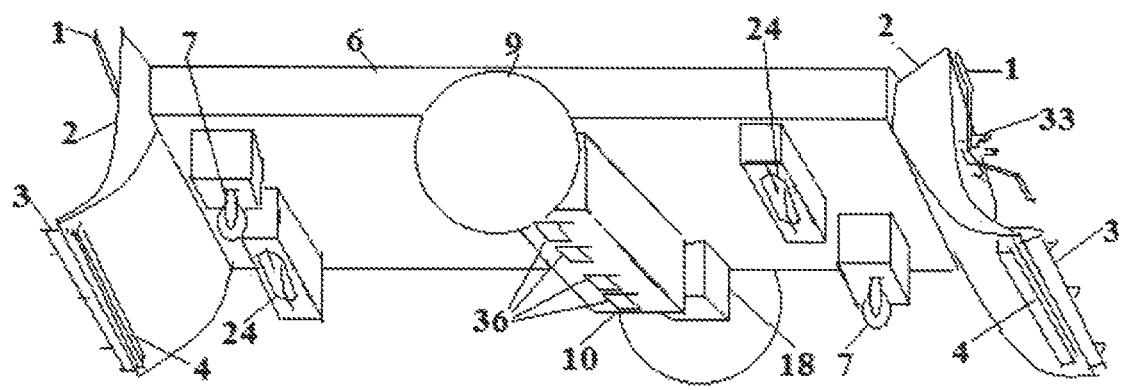
FIG. 4B is a perspective view of the bottom of the embodiment of the snowplow shown in FIG. 4A.
Figure 12:
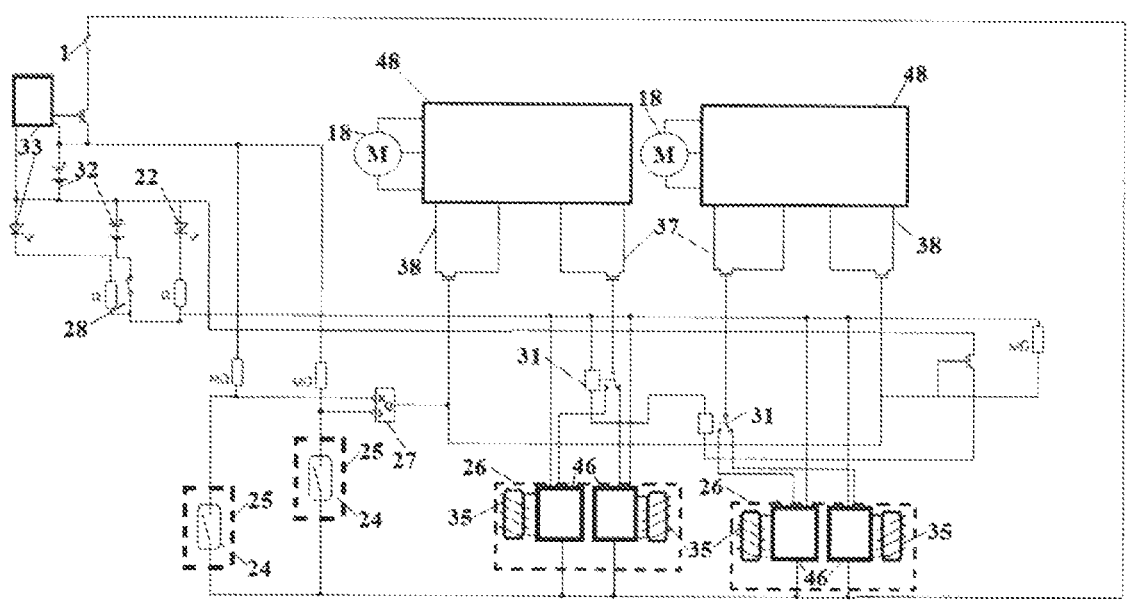
FIG. 12 is a schematic view of the system for connecting the control circuit to a brushless motor controller in the case where a motor cannot be controlled through a direct series connection to the power source through a transistor, relay or other switching device.

For a metal-guided variation shown in FIG. 3A, the guidance system comprises a plurality of metal-detecting sensors 35 positioned on the underside of the plow in such a way as to maintain close proximity to the road surface, a non-limiting example being a length of copper wire wrapped around a metallic core and circuitry 46 (FIG. 12) converting a signal within that wire into current to function as a metal detector as is achieved in the TS-75 manufactured by Eastern Co/All-Sun of Zhangzhou. The metal detectors may be installed on the interior of the apparatus for protection, provided that they are far from any metal components, for example in a plastic projection 10 from the frame 6.

Figure 9:
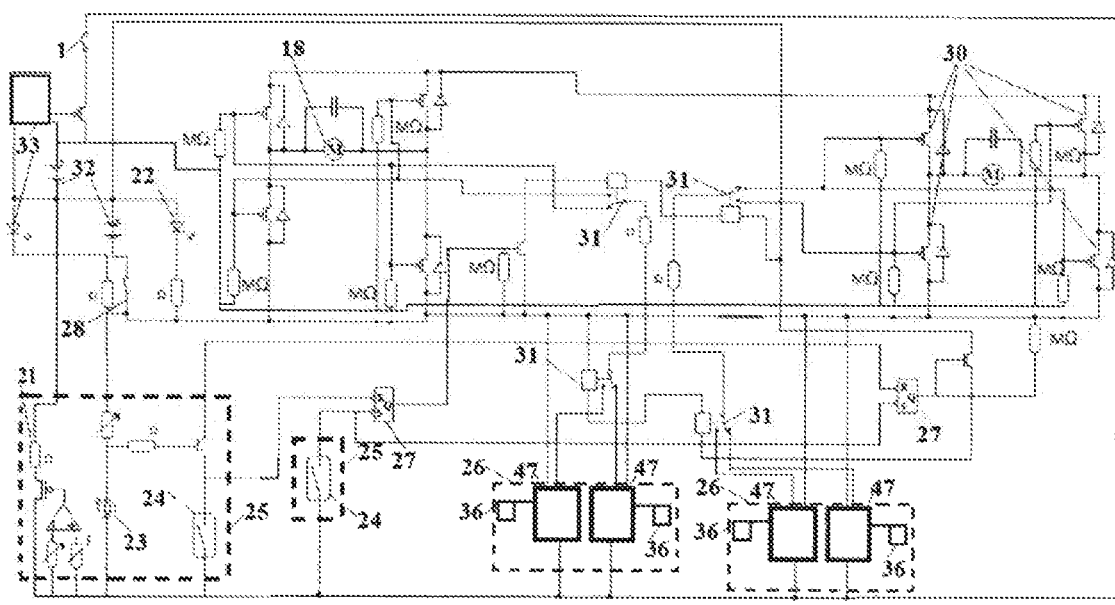
FIG. 9 is a circuit diagram for one possible control system of the induction based guiding embodiment of the device with a combination of magnetic and optical boundary sensors. Some high-value pull-up and pull-down resistors have been omitted to simplify the diagram.

For an induction-guided variation, the guidance system comprises a plurality of pieces of metal within which voltage is induced by proximity to electromagnetic field 36 (FIG. 4A) positioned in such a way as to maintain proximity to the road surface, and circuitry amplifying this voltage to a level which can switch a transistor 47 (FIG. 9). The pieces of metal may be installed inside the body of the apparatus for protection provided that they are far from any metal or other components which may cause interference, for example in a plastic projection from the frame 6 (FIG. 1A).

As shown in FIG. 1A, a central processor 13 shown mounted on frame includes control circuitry, including voltage comparators, which will compare the voltage passing through the sensors described in this disclosure (E and G) with a pre-set reference voltage 29 (FIGS. 7 to 10). The outputs of the comparators control the bases or gates of transistors 30 (FIGS. 7 to 10) through whose collectors and emitters/sources drains one of the connections between the power source 32 (FIG. 1A, 1C, 7 to 10) and a motor is made when a signal is received from the processor. The comparators and transistors could be substituted by alternative components such as operational amplifiers or relays respectively, but simple comparator chips such as the LM2901 and field-effect transistors such as the IRFZ44 provide one method of digital control. Alternatively, an integrated circuit functionally equivalent to a relay such as CD4053 may be substituted for one or more of the comparators, if its gates are controlled by one or more of the sensors. With some types of sensor simple voltage dividers may replace one or all of the comparators. The central processor could also be a programmable computer linked to the sensors.

Figure 10:
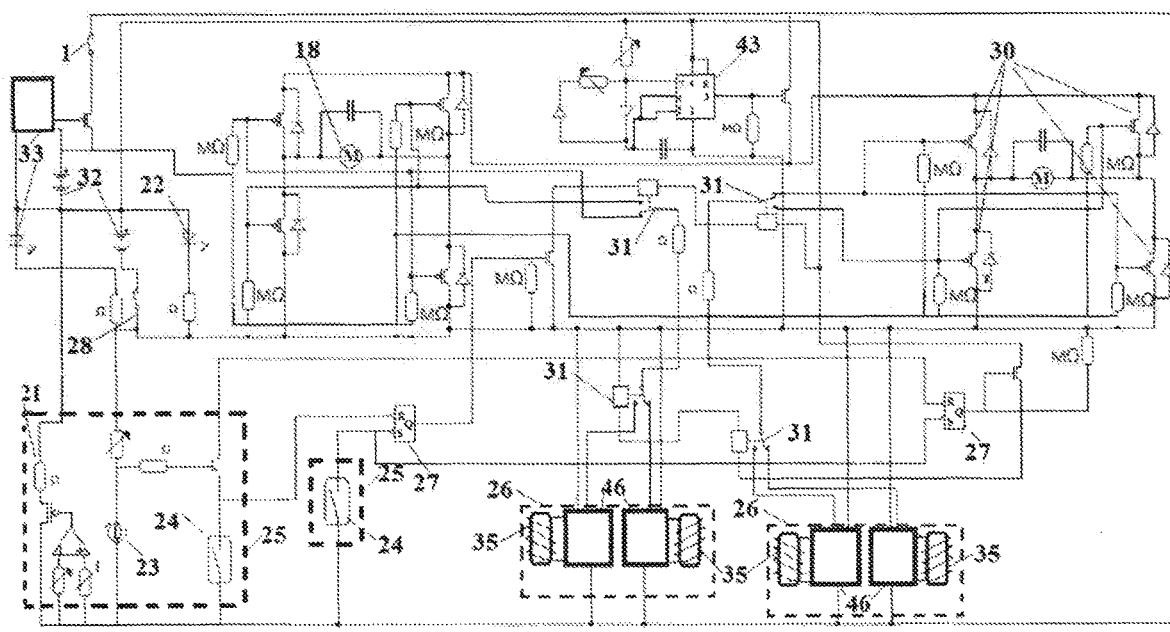
FIG. 10 is a circuit diagram for one possible control system for the embodiment of the device guided by metal markers with a combination of optical and magnetic boundary sensors. Some high-value pull-up and pull-down resistors have been omitted to simplify the diagram.

As shown in FIG. 10, an electronic latch 27 (such as a CD4043/CD4044 or a 555 in bistable mode) which shall control both the direction in which the motors are driven and either, for an optical variation, the power supply to the light sources, or, for a variation guided by induction, metal or magnets, which of the guidance sensor units 26 (FIG. 1A, 1C, 7 to 10) control the connection between the motors and the power source 32 (FIG. 1A, 1C).

The control circuitry may also, but need not necessarily, include a mechanism for controlling the speed of the apparatus. This can be achieved by pulse width modulation of the current entering the motors using a transistor or other switch controlled by a 555 timer 43 (FIG. 10). This will allow the speed of the apparatus to be customised to the road surface to be cleared and the pattern of lines to be followed. For example, a pattern with tight turns and narrow lines may require the apparatus to move more slowly.

Figure 6A:
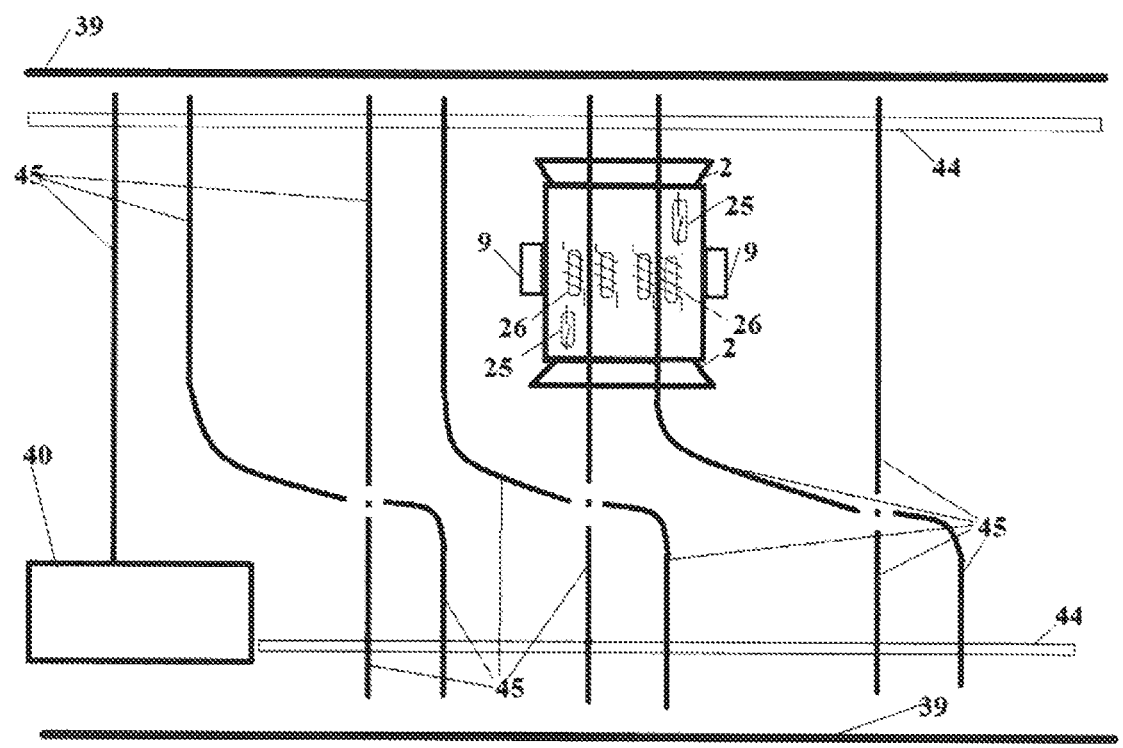
FIG. 6A is a schematic view of an additional embodiment of snow removal device clearing an area of road surface, showing lines of guidance and boundary markers, a device charging station and the device itself. This embodiment is appropriate for guidance by metal or magnetic markers.
Figure 6B:
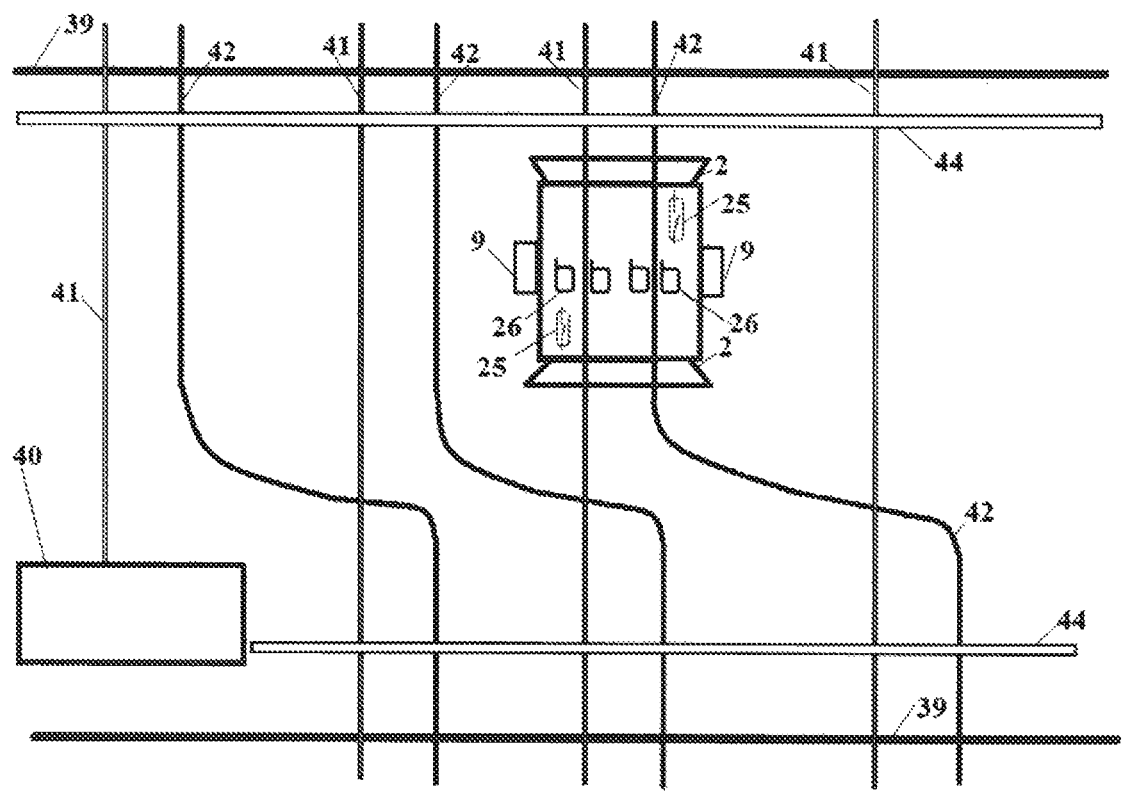
FIG. 6B is a schematic view of an additional embodiment of snow removal device clearing an area of road surface, showing lines of guidance and boundary markers, a device charging station and the device itself. This embodiment is appropriate for guidance by wires connected to an electricity supply.

One or more boundary sensor units 25 (FIG. 6A, 6B) which are similar to the guidance sensors 26 (FIG. 6A, 6B) but are configured in such a way as to detect only boundary lines composed of a plurality of boundary markers 44 (FIG. 6A, 6B) which mark the proximity of the edge of the road surface 39 (FIG. 6A, 6B) which is to be cleared. The boundary sensors should usually be configured to react only to boundary markers and not the markers detected by the guidance sensors. This may be accomplished either by positioning the boundary sensors 25 in such a way that they cannot come close to the guidance markers, or by marking the boundaries with different colours from the guidance markers and either covering the light sensors in the boundary sensor units with filters which exclude light of the colour reflected by the guidance sensors, or placing the light sensors which control the latch 27 (FIGS. 7 to 10) in such a way that only light (or other electromagnetic radiation such as infrared) from the light sources intended to illuminate the boundary markers can be reflected into those light sensors, or by combining different variations of this guidance system, so that for example the apparatus might be guided by induction but the boundaries would be marked with paint, or vice versa. Different combinations of light, magnets, induction and metal as boundary and guidance markers are possible.

On contacting the boundary markers these sensors will toggle a latch 27 (FIGS. 7 to 10), which will reverse the motors by switching a double-throw relay or functional substitute such as a 4053 integrated circuit 31 (FIGS. 7 to 10) and if necessary either change the colour of light potentially available to the guidance sensor units 26 (FIGS. 7 to 10) or else remove power from some of the guidance sensor units 26 and apply it to different sensor units, depending on which variation of the guidance system is employed and how the guidance markers are arranged on the road surface. The output from the boundary sensors to a latch 27 (FIGS. 7 to 10) may be connected to capacitors of appreciable value so that the activation of the latch 27 (FIGS. 7 to 10) will not be instant and the apparatus will be able to continue in the same direction for an appreciable time after the boundary sensors have passed the appropriate markers. Said capacitors would also reduce the likelihood of the latch being accidentally triggered by imperfections in the surface. Alternatively, output from a latch may be connected to capacitors so that the motors are not reversed instantly when the latch is activated. This will allow the boundary marker itself to be kept clear of snow for future operations. One or more central control switches 28 (FIGS. 7 to 10) which can connect or disconnect all sensors, processing units and actuators from the power sources (batteries). These switches may be controlled by a wide variety of well-known methods such as touch, electricity, magnetic signals, light or other radiation, radio or telephone signals.

The snow plow may be returned to a station 40 (FIG. 6B) for recharging at the end of its function in order to recharge its batteries, if the power level is sufficiently low. Several designs for such stations have already been disclosed in U.S. Pat. No. 5,272,431 A, 5461298 A, 6498454 B1, EP 1302147 A1, which are incorporated herein in their entirety by reference.

Operation

Figure 5:
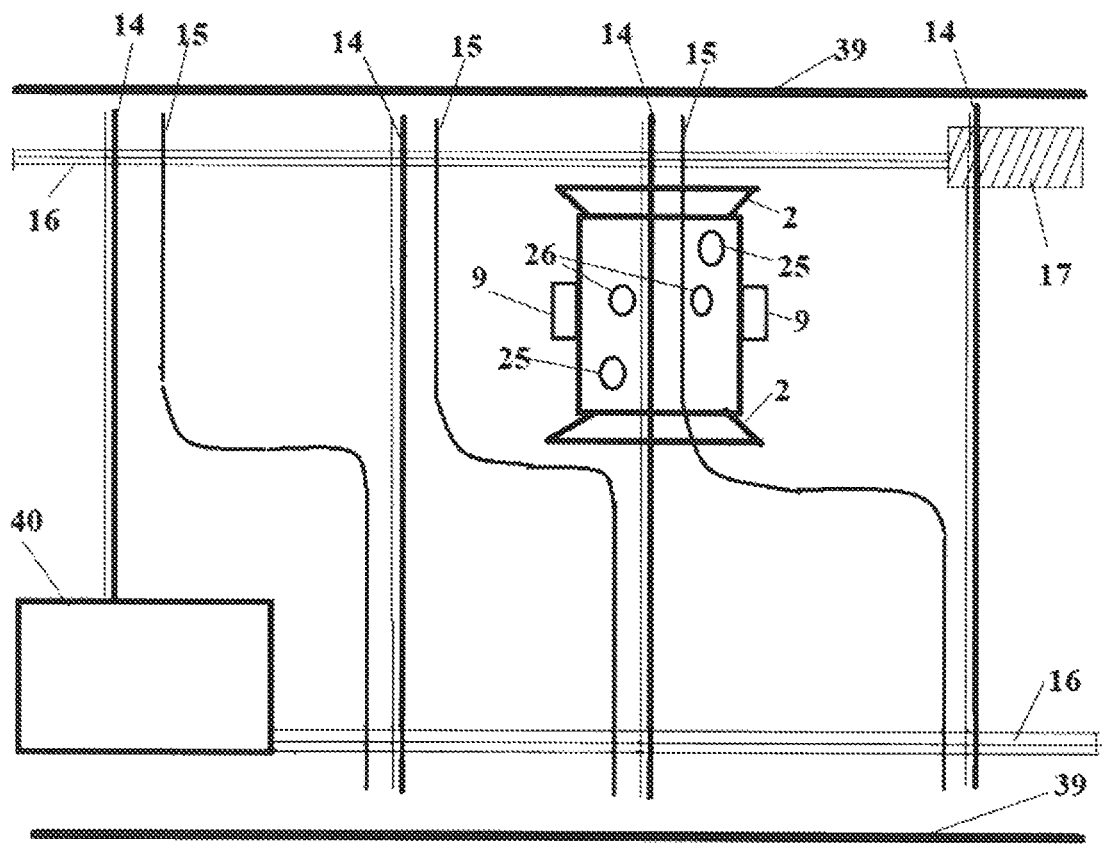
FIG. 5 is a schematic view of the optically-guided embodiment of the snow removal device clearing an area of road surface, showing lines of guidance and boundary markers, a device charging station and the device itself.

Markers can be applied to the road surface to be kept clear in advance of snowfall or after clearing snow by conventional means. The markers may consist of coloured lines 14, 15, 16, 17, (FIG. 5) or metal, or objects capable of contrasting with the road surface by presenting a different magnetic field or by inducing a voltage in part of the apparatus where the normal road surface does not. For non-visual based markers, such as magnetic, the latter may be embedded under the surface, either at time of construction, such as a driveway of a residence, or retrofitted if the driveway is being replaced. Thus, one or more lines of guidance markers may be placed or painted on a top surface, or under the top surface, of an area to be cleared of snow. The one or more lines are configured to span the area of be cleared of snow so that the snow plow can detect them at while traversing across the surface.

The guidance sensor units shall be configured so as to trigger the central processor 13 (FIG. 1A, 1C) to activate transistors (or relays or other substitutes) which transmit electricity from the power source to one or other motor 18 (FIG. 1A) when said sensors detect a guidance marker. The guidance system may be triggered by either the presence or absence of a guidance marker so long as the combination causes the apparatus to follow a line. For example, in one non-limiting embodiment the system may be set up such that when a sensor on the starboard side of the apparatus detects a line the port-side motor will be connected to the power source, and when it does not detect a line the port-side motor will be disconnected from the power source. Alternatively, the starboard side sensor may disconnect the starboard-side motor when it detects a line and connect the starboard-side motor when it does not detect a line. Various combinations are possible which can achieve the line-following motion and will lead to one or other of the motors being activated or deactivated if the apparatus moves away from the line of guidance markers so as to induce the apparatus as a whole to follow the guidance lines. While for the preferred embodiment illustrated in the figures the guidance markers run along the middle of the assigned path, they might also be placed for example on either side of said path.

On reaching a marker indicating the boundary of the area of road surface assigned to the apparatus the boundary sensor will activate a latch 27 (FIGS. 7 to 10) in the central processor 13 (FIG. 1A). This latch will perform a slightly different task dependent on which embodiment of the guidance system has been implemented.

For an optically-guided embodiment of the plow, the latch will remove power from the active light source and then apply power to either a nearby light source of a different colour, or else the latch may apply power to an alternative light source which is located at a different position on the apparatus, which will be kept isolated from the other light source so that it can illuminate a different set of light sensors and may emit light of a different colour. Which of these is appropriate will depend on how the guidance markers are to be laid out.

Secondly, the latch 27 (FIGS. 7 to 10) will switch the outputs from the central processing unit from one combination of transistors (or, for example, relays) to another, such that output which would previously have caused the motors to move the apparatus forward will now cause the apparatus to move in the opposite direction, this being easily accomplished by combining several transistors in an 'H-bridge' configuration as illustrated in FIGS. 7 to 10.

For a metal-, magnet-, or induction-guided variation the latch will disconnect one set of sensors from the central processing unit and instead connect a different set of detectors which are placed at a different position on the apparatus, and, secondly, switch the outputs from the central processing unit from one combination of transistors (or, for example, relays) to another, such that output which would previously have caused the motors to move the apparatus forward will now cause the apparatus to move in the opposite direction, this being easily accomplished by combining several transistors in 'H-bridge' configurations.

In any of the variations, the activation of the latch 27 (FIGS. 7 to 10) may be delayed by means of capacitors attached to its inputs so that the latch is not activated instantly when the boundary sensors detect a marker, which will cause the apparatus to pass slightly beyond the boundary markers and keep them clear of snow for future use.

On reaching the end of the assigned path, the apparatus will detect a final variety of marker which will cause it to reverse its direction but which does not also change which guidance sensors are in use or the colour of light. This may be achieved by employing a second latch triggered by a different colour 17 (FIG. 5, FIG. 7) or by a boundary marker of a different type such as a magnetic marker.

In this way, by applying an appropriate pattern to the road surface the apparatus can be induced to plow snow efficiently from the assigned surface, piling it at the edges as required, and to return automatically to its starting position.

While the optical, magnetic and inductive guidance systems have been presented here as separate variations, they may be employed in various combinations. For example, a variant of the apparatus might be guided along its path by induction but have its direction reversed by a latch triggered by an optical sensor when it reaches a boundary defined by coloured paint. It should be clear to an individual possessing ordinary skill in the art that the apparatus could be made to perform more complex operations by applying alternative patterns of markers to the road surface. For example, the addition of a large array of light sensors and strips of reflective paint in a barcode pattern may be used to trigger the apparatus to move in a predetermined way. If actuators are installed between the plow blade 2 and the frame 6 shown in FIG. 1, for example as disclosed in U.S. Pat. No. 5,815,956 A or U.S. Pat. No. 4,304,057 A, a particular combination of markers could trigger those actuators to tip the blade and dislodge accumulated snow.

The steering pattern may be smoothed by applying pulse-width modulation speed control to one or both of the motors, as disclosed in U.S. Pat. No. 4,371,819 A and CA 1156745 A1. The comparators may produce digital outputs or be operational amplifiers which produce larger or smaller signals in proportion to the differences in voltage at their inverting and non-inverting inputs. Depending on the road surface and pattern of markers, the application of speed control to the motors may be necessary in order to prevent overshoot of the lines of markers. The integration of this speed control system allows the guidance system to be customised to the road markers.

While in the preferred embodiment described herein the apparatus is steered by adjusting the relative speeds of motors on the left and right sides of the apparatus, steering could also be accomplished by a variety of widely-known methods such as a tiller, articulation of the body, or altering the direction of the wheels as is common in conventional automobiles. The wheels of the preferred embodiment may be substituted by alternative means of locomotion such as tracks (disclosed in U.S. Pat. No. 2,644,539 A) according to conditions.

The control switch 28 (FIGS. 7 to 10) may be controlled by radio, internet connection or other means and the apparatus may be monitored using a camera or videorecorder connected to the internet (see for example U.S. Pat. No. 5,157,491 A).

Wires transmitting signals within the apparatus may be bypassed by wireless transfers of energy, including opto-couplers, fibre-optics, microwave, radio transmission and other means of wirelessly transmitting signals or energy.

Any type of reversible electrical motor (or alternative motor whose rotation can be controlled by electrical signals) may be used, including in-wheel or hub motors. Some types of motor, such as brushless direct-current motors, cannot be controlled directly by engaging or disengaging them from a power source. Instead, these motors require separate controller units 48 (FIG. 12) to alternately electrify different coils within the motor. These may be incorporated into the design by connecting a transistor (or functional substitute) controlled by the guidance sensors, through the central processing unit, across the gap which ordinarily separates the main power supply from the wire 37 (FIG. 12) activating the motor (the "throttle") and connecting another transistor (or functional substitute) controlled by the boundary sensor, through the central processing unit, between the wires 38 (FIG. 12) which ordinarily control the direction of the motor's rotation.

This description is exemplary and should not be interpreted as limiting the invention or its applications. Specific parts or part numbers mentioned in the description may be substituted by functional equivalents.

Therefore what is claimed is:

1. A system for semi-autonomous robotic snow plowing, comprising:
   one or more patterns of electrified guidance markers on a top surface, in a top surface or under said top surface, of an area to be cleared of snow, which contrast with said top surface in that they produce a temporary electromagnetic field when a voltage is applied to them, laid out for the purpose of navigating the system;
   boundary markers around a periphery of the area to be cleared of snow, said boundary markers contrasting with the surface in their color, in that they are metallic, in that they are magnets or in that they produce a temporary electromagnetic field when voltage is applied to them;
   a motorized vehicle having at least one snow plow blade affixed thereto, said motorized vehicle including at least one drive motor connected to a motor control system;
   one or more sensors mounted on said motorized vehicle and configured for detecting a presence or absence of the electromagnetic field produced by said one or more patterns of electrified guidance markers on or in a top surface, or under said top surface, of an area to be cleared of snow; and
   said motorized vehicle including a central processing unit connected to said motor control system, and said one or more sensors, said central processing system being configured to receive sensor readings from said one or more sensors, and based on said sensor readings determining a position of said motorized vehicle with respect to said one or more patterns of electrified guidance markers, and said central processing unit using said motor control system to move said motorized vehicle into a given position with respect to said electrified guidance markers while applying sufficient power to move snow while engaging any snow to be cleared with said at least one plow;
   an electronic latch, triggered by the output of one or more sensors, said sensors being capable of detecting color, metal, magnets or electromagnetic fields and positioned so as to detect said boundary markers installed in or on or under the surface, said latch being capable when triggered of changing the direction in which the one or more motors move the system.

2. The system according to claim 1 wherein the system includes a time delay between the detection of the boundary markers and the altering of the direction in which the motors drive the vehicle by said electronic latch.

3. The system according to claim 1 wherein at least one capacitive sensor is mounted on at least one of the plows.

4. A system for semi-autonomous robotic snow plowing, comprising:
   one or more patterns of guidance markers on a top surface of an area to be cleared of snow, which contrast with said top surface in that they are magnets, laid out for the purpose of navigating the system;
   boundary markers around a periphery of the area to be cleared of snow, said boundary markers contrasting with the surface in their color, in that they are metallic, in that they are magnets or in that they produce a temporary electromagnetic field when voltage is applied to them;

a motorized vehicle having at least one snow plow blade affixed thereto, said motorized vehicle including at least one drive motor connected to a motor control system;

one or more sensors mounted on said motorized vehicle and configured for detecting the presence or absence of a magnetic field produced by said one or more patterns of magnetic guidance markers on or in a top surface, or under said top surface, of an area to be cleared of snow; and said motorized vehicle including a central processing unit connected to said motor control system, and said one or more sensors, said central processing system being configured to receive sensor readings from said one or more sensors, and based on said sensor readings determining a position of said motorized vehicle with respect to said one or more patterns of magnetic guidance markers and said central processing unit using said motor control system to move said motorized vehicle into a given position with respect to said magnetic guidance markers while applying sufficient power to move snow while engaging any snow to be cleared with said at least one plow;

an electronic latch, triggered by the output of one or more sensors, said sensors being capable of detecting color, metal, magnets or electromagnetic fields and positioned so as to detect said boundary markers installed in or on or under the surface, said latch being capable when triggered of changing the direction in which the one or more motors move the system.

5. The system according to claim 4 wherein at least one capacitive sensor is mounted on at least one of the plows.

6. The system according to claim 4 wherein the system includes a time delay between the detection of the boundary markers and the altering of the direction in which the motors drive the vehicle by said electronic latch.

7. A system for semi-autonomous robotic snow plowing, comprising:

one or more patterns of colored guidance markers on or in a top surface of an area to be cleared of snow, which contrast with said top surface in their color, laid out for the purpose of navigating the system;

boundary markers around a periphery of the area to be cleared of snow, said boundary markers contrasting with the surface in their color, in that they are metallic, in that they are magnets or in that they produce a temporary electromagnetic field when voltage is applied to them;

a motorized vehicle having at least one snow plow blade affixed thereto, said motorized vehicle including at least one drive motor connected to a motor control system;

one or more sensors mounted on said motorized vehicle and configured for detecting a presence or absence of said one or more patterns of colored guidance markers on or in a top surface, or under said top surface, of an area to be cleared of snow by said markers' color; and said motorized vehicle including a central processing unit connected to said motor control system, and said one or more sensors, said central processing system being configured to receive sensor readings from said one or more sensors, and based on said sensor readings determining a position of said motorized vehicle with respect to said one or more patterns of colored guidance markers, and said central processing unit using said motor control system to move said motorized vehicle into a given position with respect to said colored guidance markers while applying sufficient power to move snow while engaging any snow to be cleared with said at least one plow;

an electronic latch, triggered by the output of one or more sensors, said sensors being capable of detecting color, metal, magnets or electromagnetic fields and positioned so as to detect said boundary markers and said latch being capable when triggered of changing the direction in which the one or more motors move the system.

8. The system according to claim 7 wherein at least one capacitive sensor is mounted on at least one of the plows.

9. The system according to claim 7 wherein the system includes a time delay between the detection of the boundary markers and the altering of the direction in which the motors drive the vehicle by said electronic latch.

10. A system for semi-autonomous robotic snow plowing, comprising:

one or more patterns of colored guidance markers on or in a top surface, of an area to be cleared of snow, which contrast with said top surface in their color, laid out for the purpose of navigating the system;

a motorized vehicle having at least one snow plow blade affixed thereto, said motorized vehicle including at least one drive motor connected to a motor control system;

one or more sensors mounted on said motorized vehicle and configured for detecting a presence or absence of said one or more patterns of colored guidance markers on or in a top surface, or under said top surface, of an area to be cleared of snow;

a heating element located on a bottom of the vehicle and spaced above the surface for melting residual snow, said heating element being enclosed by a cover which concentrates air warmed by the heating element in the space between the sensor and the surface being cleared and wherein the flow of energy to the heating element is regulated by a temperature sensor; and said motorized vehicle including a central processing unit connected to said motor control system, and said one or more sensors, said central processing system being configured to receive sensor readings from said one or more sensors, and based on said sensor readings determining a position of said motorized vehicle with respect to said one or more patterns of colored guidance markers, and said central processing unit using said motor control system to move said motorized vehicle into a given position with respect to said colored guidance markers while applying sufficient power to move snow while engaging any snow to be cleared with said at least one plow.

11. The system according to claim 10 wherein the colored guidance markers are combined with one or more markers consisting of pieces of metal and the vehicle incorporates at least one sensor capable of detecting metal.

12. The system according to claim 10 wherein the colored guidance markers are combined with one or more markers consisting of magnets and the vehicle incorporates at least one sensor capable of detecting magnets.

* * * * *